(12) United States Patent
Ascione et al.

(10) Patent No.: US 10,764,335 B2
(45) Date of Patent: Sep. 1, 2020

(54) LAWFUL INTERCEPTION

(71) Applicant: Telefonaktiebolaget LM Ericsson (publ), Stockholm (SE)

(72) Inventors: Mario Ascione, Torre del Greco (IT); Andrea Senatore, Pellezano (IT); Francesco Toro, Baronissi (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 16/327,000

(22) PCT Filed: Aug. 23, 2016

(86) PCT No.: PCT/SE2016/050783
§ 371 (c)(1),
(2) Date: Feb. 21, 2019

(87) PCT Pub. No.: WO2018/038652
PCT Pub. Date: Mar. 1, 2018

(65) Prior Publication Data
US 2020/0084246 A1    Mar. 12, 2020

(51) Int. Cl.
*H04L 29/06* (2006.01)
(52) U.S. Cl.
CPC ...... *H04L 63/306* (2013.01); *H04L 29/06217* (2013.01); *H04L 65/1006* (2013.01); *H04L 65/1016* (2013.01); *H04L 65/1069* (2013.01)
(58) Field of Classification Search
CPC .............. H04L 63/306; H04L 65/1016; H04L 65/1069; H04L 65/1006; H04L 29/06217
USPC ........................................................ 370/329
See application file for complete search history.

(56) References Cited

U.S. PATENT DOCUMENTS

| 2012/0155333 A1* | 6/2012 | Yoon | H04L 12/28 370/259 |
| 2012/0250584 A1* | 10/2012 | Jayaraman | H04W 12/02 370/259 |
| 2013/0182841 A1* | 7/2013 | Buckley | H04L 9/083 380/44 |

(Continued)

FOREIGN PATENT DOCUMENTS

| WO | 2013182256 A1 | 12/2013 |
| WO | 2015116229 A1 | 8/2015 |

OTHER PUBLICATIONS

European Telecommunications Standards Institute, "Lawful Interception (LI); Handover Interface and Service-Specific Details (SSD) for IP delivery; Part 5: Service-specific details for IP Multimedia Services", Technical Specification, ETSI TS 102 232-5 V3.6.1, Aug. 1, 2016, pp. 1-28, ETSI.

(Continued)

*Primary Examiner* — Faisal Choudhury
(74) *Attorney, Agent, or Firm* — Coats + Bennett, PLLC

(57) ABSTRACT

A mediation function receives intercepted signaling and media payload messages from an IP Multimedia Subsystem, IMS. Local correlation numbers (304) are calculated and a table (300) comprising correlation numbers (304) and media payload mapping information (306) is maintained in order to enable the mediation function to provide a law enforcement agency, LEA, with intercepted media payload together with information that enables the LEA to decode the media payload in real-time.

18 Claims, 4 Drawing Sheets

(56) References Cited

U.S. PATENT DOCUMENTS

2014/0010228 A1* 1/2014 Maione .................. H04L 63/30
370/352

OTHER PUBLICATIONS

3rd Generation Partnership Project, "3rd Generation Partnership Project; Technical Specification Group Services and System Aspects; 3G security; Handover interface for Lawful Interception (LI) (Release 12)", Technical Specification, 3GPP TS 33.108 V12.12.0, Mar. 3, 2016, pp. 1-251, 3GPP.

* cited by examiner

LAWFUL INTERCEPTION

TECHNICAL FIELD

Embodiments herein relate to wireless communication and more specifically to handling lawful interception information that is being intercepted in an internet protocol multimedia subsystem.

BACKGROUND

The evolution of telecommunication during the last few decades has involved changes both in the access network and in the core/services network. Earlier fixed landline telecommunication systems as well as wireless communication systems provided circuit switched (CS) telephone calls and, to a limited extent, data communication between subscribers. Later wireless communication systems have evolved into very advanced digital data communication systems where telephone, i.e. voice, calls as well as data connections and services associated with data connections are based on internet protocol (IP) standards. Much work regarding standardization of the evolution has taken place within the third generation partnership project (3GPP) and Long Term Evolution (LTE) and IP Multimedia Subsystem (IMS) are respectively major examples of the 3GPP work.

LTE, with the enhanced packet core (EPC), is the natural upgrade path for carriers with both Global System for Mobile Communications/Universal Mobile Telecommunications System (GSM/UMTS) networks as well as Code division multiple access 2000 (CDMA2000) networks. IMS core network is the evolution of Mobile Softswitch Solution core network (MSS) where the telephony services are provided through AS (Application Server). An IMS network is able to provide telephony services regardless of access technology, although when LTE access technology is used, a high quality of service can be guaranteed especially for real-time services.

Voice over LTE (VoLTE) service has been introduced to allow voice service through fourth generation (4G) networks (i.e. LTE and EPC) by means of IMS, since the fourth generation mobile is a packet-only network without the CS core. A VoLTE call can be seen as an IMS voice over IP (VoIP) call using the LTE access network.

In general IMS multimedia services are based on two main protocols: session initiation protocol (SIP) for control signaling and Real-Time Protocol (RTP) for media streams. So from a lawful Interception (LI) point of view the interception of a VoLTE call or other IMS services, into IMS domain, means interception of SIP signaling and interception of related RTP streams.

VoLTE technology is able to carry a speech call on an IMS network giving to the end user an improved experience in comparison with a traditional CS call. This is essentially due to the fact that SIP signaling is more flexible than the previous SS7 signaling used in CS networks and also due to the fact that the RTP protocol allows use of coders/decoders (codecs) that are more efficient and provide a better quality of service than circuit switched voice services.

From a lawful interception point of view, however, there are some drawbacks related to VoLTE calls. Specifically, law enforcement agencies (LEA) should be able to rebuild an intercepted call from handover interface (HI) information provided by a Mediation Device. HI port 3 (HI3) flow carries RTP packets whilst HI port 2 (HI2) includes SIP signaling and some other information to be used to decode RTP packets and rebuild the voice during the call. However, lawful interception standards (e.g. any European Telecommunications Standards Institute (ETSI), 3GPP or American National Standards Institute (ANSI)) do not foresee the presence of all the useful information needed to decode the received VoIP payload inside HI3 headers. This obliges the LEA to implement heavy post processing business logic to work around this lack of information on the HI3 interface.

This drawback is further stressed considering that the different providers of wireless communication devices can use different RTP codecs. Also, the codec may also be changed by various network elements during a VoLTE call. Since codec information is spread over the HI2 and HI3 interfaces, the LEA needs to buffer HI2 and HI3 packets in order to be able to post-process the packets when the intercepted call has been terminated. The result is that from a lawful interception point of view there is a degraded service in case of VoLTE call, in contrast to the service that is provided when intercepting traditional CS calls. In this context, a prior art publication is the 3GPP technical specification TS 33.108 V12.12.0.

SUMMARY

In view of the above, an object of the present disclosure is to overcome or at least mitigate at least some of the drawbacks related to lawful interception in an IMS context.

This is achieved in a first aspect by a method performed by a mediation function for handling LI information that is being intercepted in an IMS. The method comprises receiving, from the IMS, a plurality of signalling messages where each message comprises information that defines an identity of an intercepted entity and a mapping information value. The mapping information value comprises a mapping of a media payload type number to a media encoding name that identifies a media payload format. A respective first correlation number associated with respective identities of the intercepted entities is calculated. The first correlation numbers and the mapping information values are stored such that a table comprising records is maintained. Each record comprises a correlation number and at least one corresponding mapping information value.

A plurality of media messages are received from the IMS, each message comprising information that defines an identity of an intercepted entity, media payload and a media payload type number associated with the media payload. Based on the received media messages, a calculation is made of a respective second correlation number associated with respective identities of the intercepted entities.

For each received media message, a mapping information value corresponding to the second correlation number and corresponding to the media payload type number are extracted from the table. For each received media message, transmission is made to a LEA of a message that comprises the media payload of the received media message and that comprises a media encoding name comprised in the extracted mapping information value.

In other words, a mediation function provides to a LEA media encoding information that the LEA needs to use in order to rebuild contents, e.g. voice data in a VoLTE call, from media messages in real time. This will enable the LEA to handle the intercepted media data in real time and avoid buffering and also avoid more or less heavy post processing of data and thereby achieve feature parity with legacy CS call interception.

Embodiments include those where the reception of a plurality of messages from the IMS comprises reception, via an X2 interface, of a plurality of session initiation protocol, SIP, messages that comprise session description protocol, SDP, fields.

Embodiments include those where the mapping information value is an RTP rtpmap attribute in an SDP field and where the reception of a plurality of media messages comprises reception, via an X3 interface, of RTP, packets. In at least some of these embodiments, the transmission of the media messages comprises transmission via an HI3 interface of the RTP packets, and the media encoding names are comprised in respective HI3 header fields.

Embodiments include those where the calculation of any of the first correlation number and the second correlation number comprises calculating a call session identifier of the intercepted entity. In at least some of these embodiments, the calculation of the call session identifier comprises obtaining IMS charging information assigned to the intercepted entity.

In another aspect there is provided a mediation function apparatus. The mediation function apparatus is for handling LI information that is being intercepted in an IMS. The mediation function apparatus comprises a processor, a memory and input/output circuitry. The memory contains instructions executable by the processor whereby the mediation function apparatus is operative to:

receive, from the IMS, a plurality of signaling messages, each message comprising information that defines an identity of an intercepted entity and a mapping information value that comprises a mapping of a media payload type number to a media encoding name that identifies a media payload format, calculate a respective first correlation number associated with respective identities of the intercepted entities, store the first correlation numbers and the mapping information values such that a table is maintained, said table comprising records, each record comprising a correlation number and at least one corresponding mapping information value, receive, from the IMS, a plurality of media messages, each message comprising information that defines an identity of an intercepted entity, media payload and a media payload type number associated with the media payload, calculate, based on the received media messages, a respective second correlation number associated with respective identities of the intercepted entities, extract, from the table, for each received media message, a mapping information value corresponding to the second correlation number and corresponding to the media payload type number, and transmit, to a LEA, for each received media message, a message comprising the media payload of the received media message and comprising a media encoding name comprised in the extracted mapping information value.

In another aspect there is provided a computer program, comprising instructions which, when executed on at least one processor in a mediation function apparatus, cause the mediation function apparatus to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1:
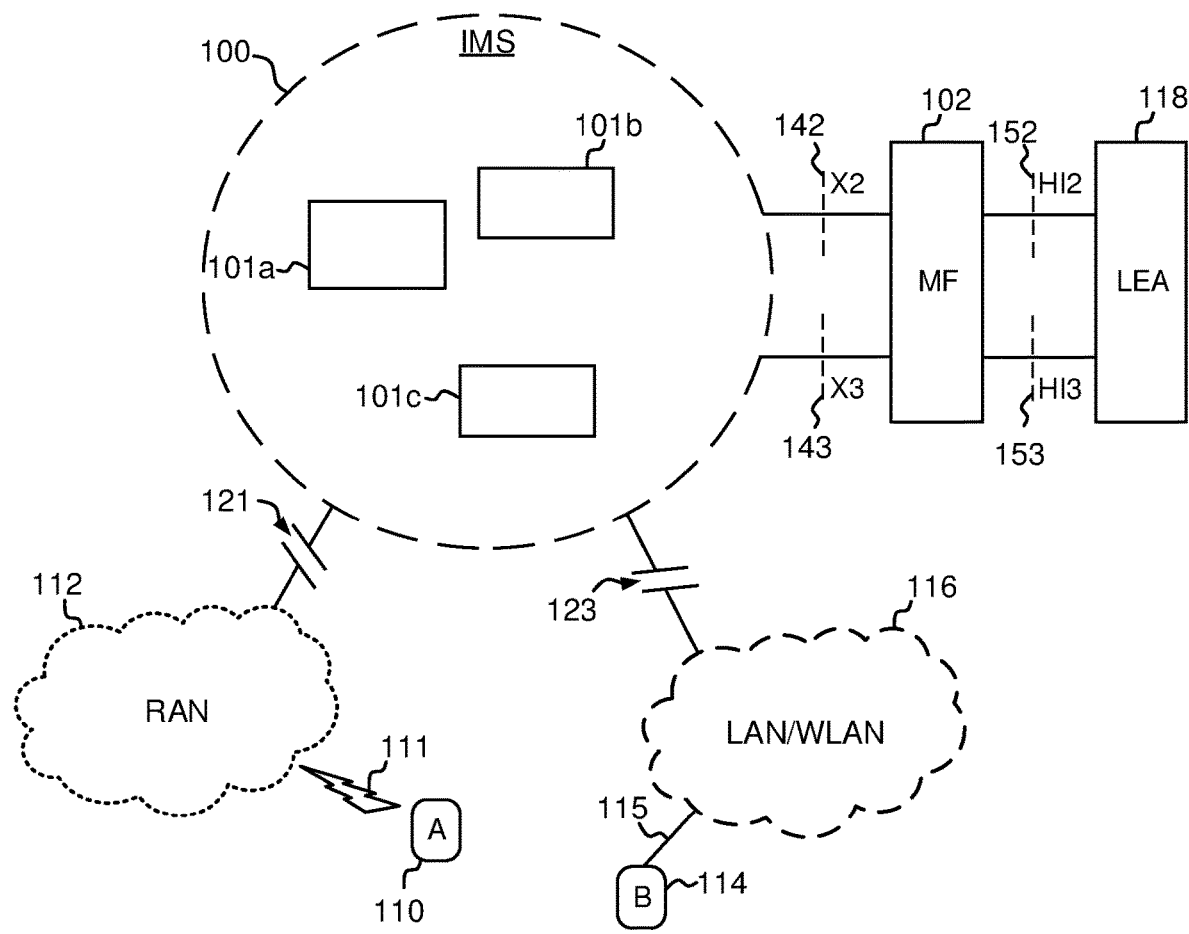
FIG. 1 schematically illustrates a functional block diagram of an IMS and entities involved in lawful interception.

FIG. 1 is an example that illustrates an IMS 100 and entities involved in lawful interception as summarized above. In some more detail, the IMS 100 is connected to two radio access networks (RAN) in the form a RAN 112, e.g. any 3GPP RAN as exemplified above, and a local area network (LAN) that may include a wireless LAN 116 that operates according to, e.g. an institute of electrical and electronics engineers (IEEE) 802.11 standard. The access networks 112, 116 are connected to the IMS 100 via interface functionality 121, 123 in appropriate gateway nodes that are not illustrated in FIG. 1. An originating entity 110 is connected via an air interface 111 to the RAN 112 and a terminating entity 114 is connected to the LAN 116 via an appropriate connection interface 115.

A mediation function 102, connected to the IMS 100, comprises appropriate lawful interception mediation functionality and thereby enables a LEA 118 to perform lawful interception of calls and media sessions involving, e.g., the originating entity 110 and the terminating entity 114.

Signaling between the entities in the IMS and the connected entities takes place by means of session initiation protocol (SIP) signaling and associated session description protocol (SDP) data. The IMS 100 interfaces with the mediation function 102 via an X2 interface 142 and via an X3 interface 143 and the mediation function 102 interfaces with the LEA 118 via an HI2 interface 152 and via an HI3 interface 153.

As the skilled person realizes, the IMS 100 typically comprises a plurality of functional entities 101a-c such as proxy call/session control functions (P-CSCF), serving call/session control function (S-CSCF) and application servers (AS) etc. that may interact within the IMS 100 as well as interact with the mediation function 102, the RAN 112 and the LAN 116. Detailed description of how these functional entities 101a-c operate, and interface functionality indicated by reference numerals 121 and 123 are outside the scope of the present disclosure.

It is to be noted that typical implementations of an IMS and the connected functional entities, including the mediation function 102, may in various embodiments realize the entities in a larger and more general processing system, e.g. in the form of one or more computer servers (e.g. a so-called cloud implementation) having functional blocks that operate to realize functionality of the IMS 100 as well as the mediation function 102.

Figures 2, 3:
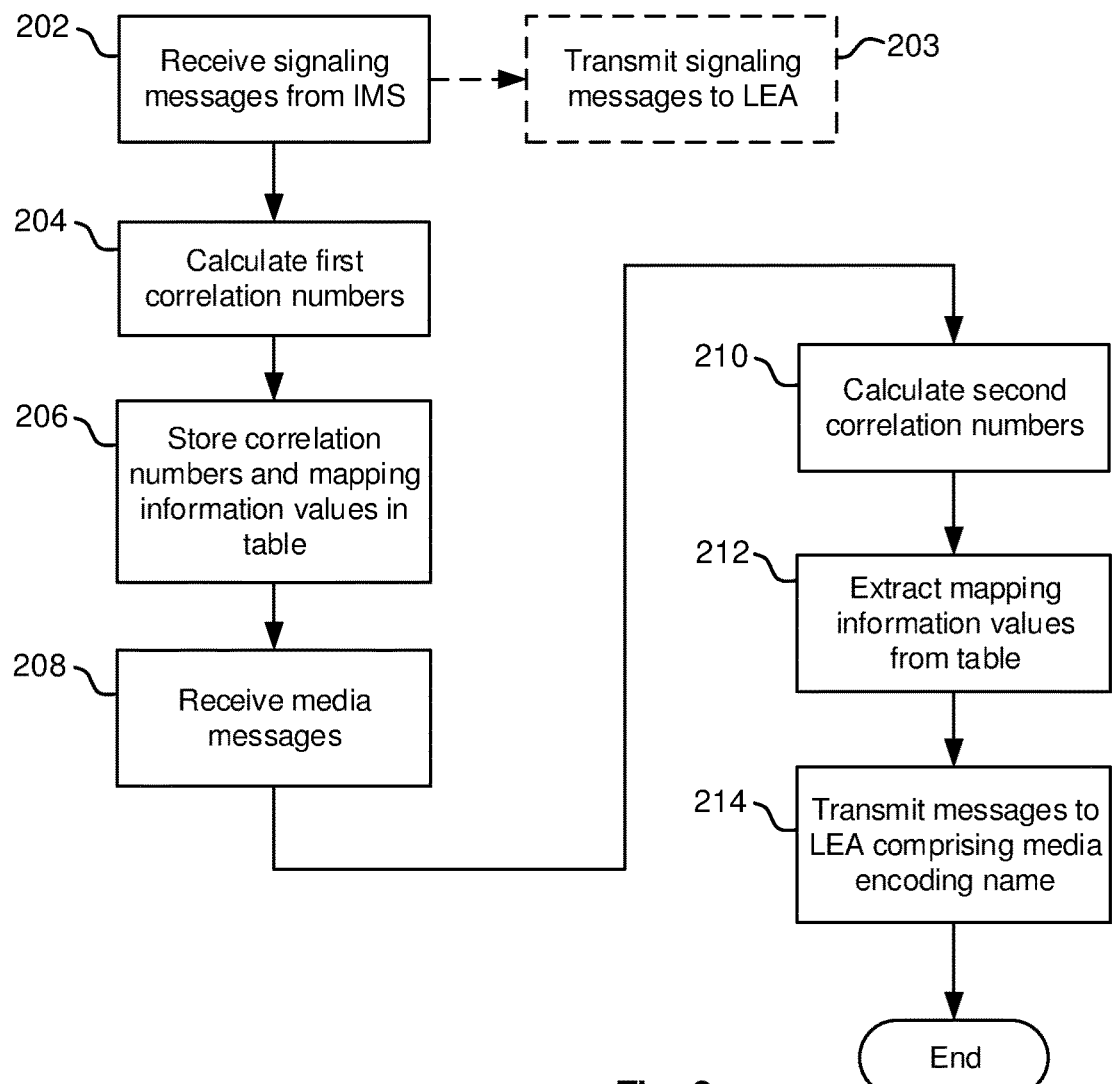
FIG. 2 is a flow chart, FIG. 3 schematically illustrates a table of correlation numbers and mapping information values.
Figure 4:
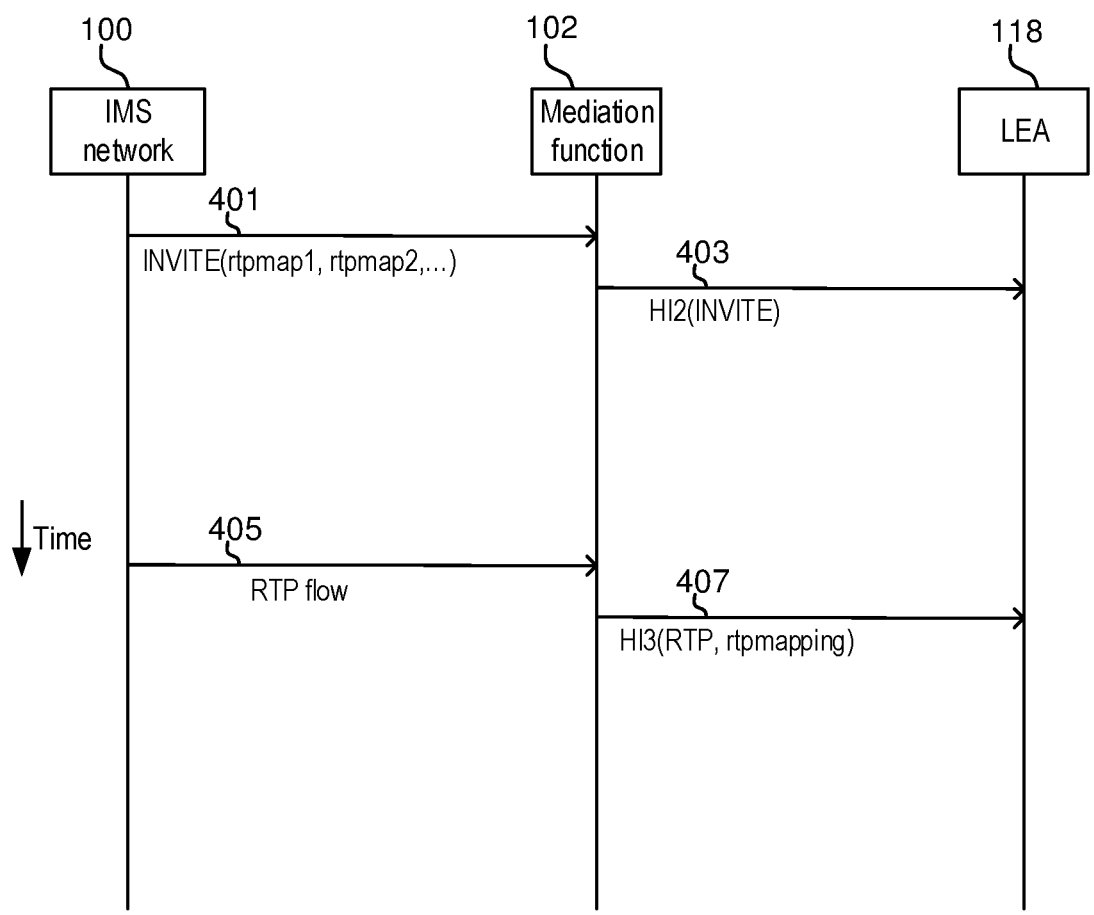
FIG. 4 is a signaling diagram, FIG. 5 schematically illustrates a mediation function apparatus, and FIG. 6 schematically illustrates a mediation function apparatus.

Turning now to FIG. 2, FIG. 3 and FIG. 4, and with continued reference to FIG. 1, a method performed by the mediation function 102 for handling LI information that is being intercepted in the IMS 100 will be described in some detail.

Prerequisite to the method are a number of steps that involve a request for lawful interception of an IMS user (i.e.

a user having an IMS subscription) that are outside the scope of the present disclosure. For example, a request for lawful interception of a call or session that comprises media payload (e.g. data packets in a VoLTE session between the originating entity 110 and terminating entity 114) has been made by the LEA 118 and received by the mediation function 102. Following the request, the mediation function 102 has interacted with appropriate entities 101 in the IMS 100 in order to initiate the requested lawful interception.

The method will now be described with reference to a number of actions performed by the mediation function 102.

Action 202

A plurality of signaling messages 401 is received from the IMS 100. Each message comprises information that defines an identity of an intercepted entity (e.g. any of the originating entity 110 and the terminating entity 114) and a mapping information value 306. The mapping information value 306 comprises a mapping of a media payload type number 308 to a media encoding name 310 that identifies a media payload format.

The reception in action 202 of a plurality of messages 401 from the IMS 100 may comprise reception via the X2 interface 142 of a plurality of SIP messages that comprise session description protocol (SDP) fields.

Furthermore, the mapping information value 306 may for example be an RTP rtpmap attribute in an SDP field and the reception of a plurality of media messages may in such examples comprise reception, via the X3 interface 143, of RTP, packets. Such an SDP field may look like any of the following (as also exemplified in FIG. 3):

a=rtpmap: 96 AMR/8000
a=rtpmap: 1 PCM/8000
a=rtpmap: 111 G722/8000 where the values 96, 1 and 111 represent media payload type numbers and "AMR/8000", "PCM/8000" and "G722/8000" represent media encoding names, i.e. codec names, and the sampling rate (8 kHz).

Action 203

Although it is not essential for the purpose of understanding the present disclosure, the received signaling messages 401 are typically transmitted to the LEA 118 in HI2 formatted packets 403 via the HI2 interface.

Action 204

The information comprised in the received messages, in action 202, is used in calculating a respective first correlation number associated with respective identities of the intercepted entities.

For example, the calculation of the first correlation numbers may comprise calculating a call session identifier of the intercepted entity, which in turn may comprise obtaining IMS charging information assigned to the intercepted entity.

Action 206

The first correlation numbers, calculated in action 204, and the mapping information values are stored such that a table 300 is maintained. The table 300 comprises records 302, where each record comprises a correlation number 304 and at least one corresponding mapping information value 306 comprising a media payload type number 308 to a media encoding name 310.

Action 208,

A plurality of media messages 405 are received from the IMS 100. Each received message 405 comprises information that defines an identity of an intercepted entity, media payload and a media payload type number associated with the media payload.

Action 210

Based on the received media messages 405, a calculation is made of a respective second correlation number associated with respective identities of the intercepted entities.

Similar to the examples regarding the calculation of the first correlation numbers, the calculation of the second correlation numbers may in some examples comprise calculating a call session identifier of the intercepted entity, which in turn may comprise obtaining IMS charging information assigned to the intercepted entity.

Action 212

For each received media message 405, an extraction is made from the table 300 of a mapping information value corresponding to the second correlation number and corresponding to the media payload type number.

Action 214

For each received media message 405, transmission is made to the LEA 118 of a message 407 comprising the media payload of the received media message 405 and comprising a media encoding name comprised in the extracted mapping information value.

For example, in embodiments where the mapping information values are RTP rtpmap attributes, the transmission in action 214 of the media messages 407 may comprise transmission of the RTP packets via the HI3 interface 153. In such examples, the media encoding names 310 may be comprised in respective HI3 header fields.

Consequently, embodiments of the method overcome drawbacks with prior art lawful interception methods, for example methods that are defined in ETSI, 3GPP and ANSI standards. A reason for this is that the methods according to these standards do not foresee on the HI3 interface the presence of information that is useful to decode the received media (e.g. VoIP) payload. In the prior art methods, the LEA must implement heavy post processing business logic to work around this lack of information on the HI3.

Adding explicit codec information on the HI3 header, as exemplified in some embodiments described above, will enable the LEA to perform more or less real-time processing and thereby reproducing the intercepted media (e.g. VoIP) payload at a performance level similar to that of interception of calls or sessions in a legacy CS environment.

Figure 5:
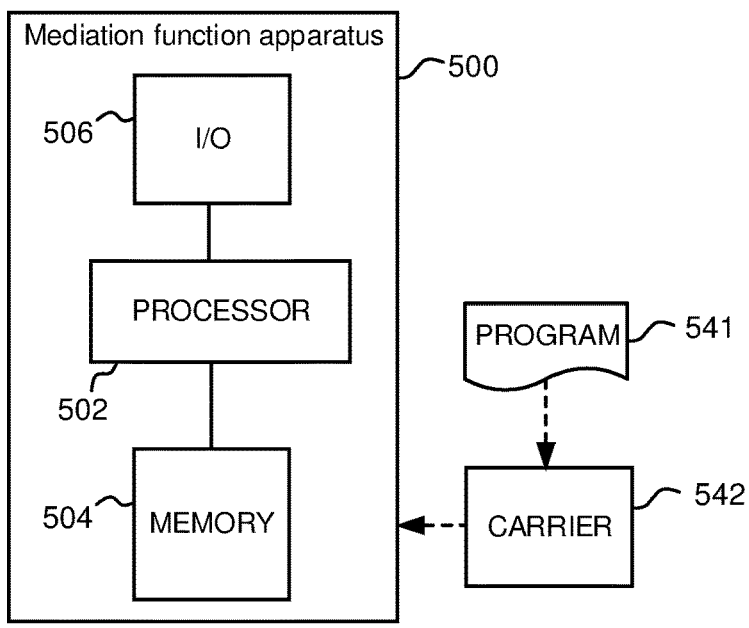

Turning now to FIG. 5, and with continued reference to FIGS. 1, 3 and 4, a mediation function apparatus 500 for handling LI information that is being intercepted in an IMS, such as the IMS 100 in FIG. 1, will be described in some detail. The mediation function apparatus 500 comprises a processor 502, a memory 504 and input/output circuitry 506. The memory 504 contains instructions executable by the processor 502 whereby the mediation function apparatus 500 is operative to:

receive, from the IMS 100, a plurality of signaling messages 401, each message 401 comprising information that defines an identity of an intercepted entity and a mapping information value 306 that comprises a mapping of a media payload type number 308 to a media encoding name 310 that identifies a media payload format, calculate a respective first correlation number associated with respective identities of the intercepted entities, store the first correlation numbers and the mapping information values such that a table 300 is maintained, said table 300 comprising records 302, each record 302 comprising a correlation number 304 and at least one corresponding mapping information value 306, receive, from the IMS 100, a plurality of media messages 405, each message 405 comprising information that defines an identity of an intercepted entity, media payload and a media payload type number associated with the media payload, calculate, based on the received media messages 405, a respective second correlation number associated with respective identities of the intercepted entities, extract, from the table 300, for each received media message 405, a mapping information value corresponding to the second correlation number and corresponding to the media payload type number, and transmit, to the LEA 118, for each received media message 405, a message 407 comprising the media payload of the received media message and comprising a media encoding name comprised in the extracted mapping information value.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the mediation function apparatus 500 is operative such that:
the reception of a plurality of messages from the IMS comprises reception, via an X2 interface, of a plurality of session initiation protocol, SIP, messages that comprise session description protocol, SDP, fields.

In some embodiments, the mediation function apparatus 500 is operative such that:
the mapping information value is a real time protocol, RTP, rtpmap attribute in an SDP field, and
the reception of a plurality of media messages comprises reception, via an X3 interface, of RTP, packets.

In some embodiments, the mediation function apparatus 500 is operative such that:
the transmission of the media messages comprises transmission, via an HI3 interface, of the RTP packets, and
the media encoding names are comprised in respective HI3 header fields.

In some embodiments, the mediation function apparatus 500 is operative such that the calculation of any of the first correlation number and the second correlation number comprises calculating a call session identifier of the intercepted entity.

In some embodiments, the mediation function apparatus 500 is operative such that the calculation of the call session identifier comprises obtaining IMS charging information assigned to the intercepted entity.

Figure 6:
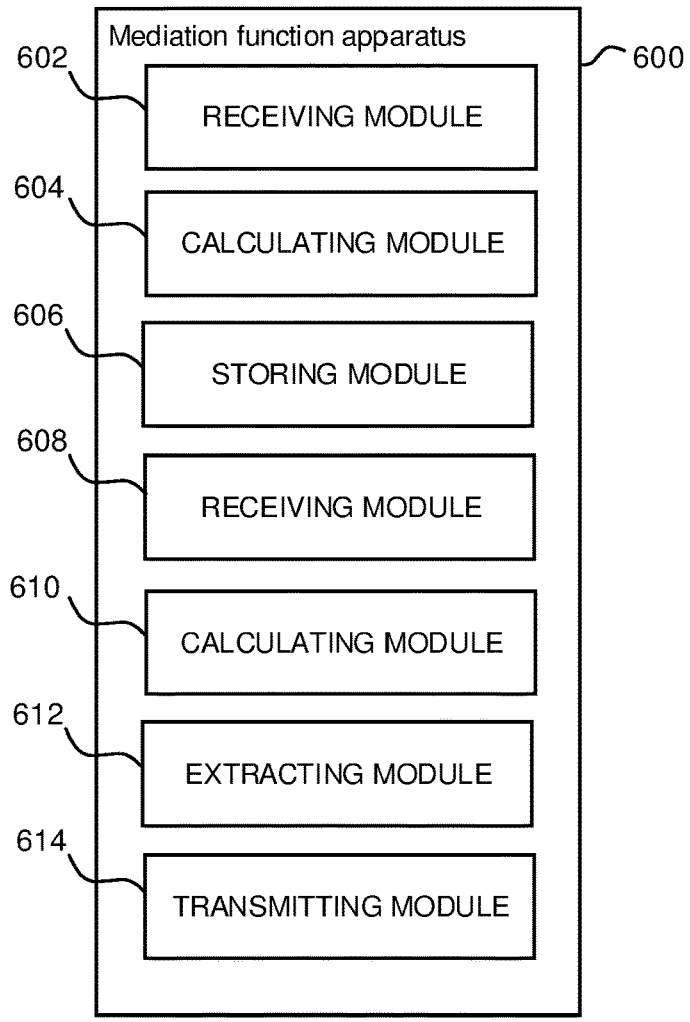

FIG. 6, illustrates schematically a mediation function apparatus 600. The mediation function apparatus 600 comprises:

a receiving module 602 configured to receive, from the IMS 100, a plurality of signaling messages 401, each message 401 comprising information that defines an identity of an intercepted entity and a mapping information value 306 that comprises a mapping of a media payload type number 308 to a media encoding name 310 that identifies a media payload format, a calculating module 604 configured to calculate a respective first correlation number associated with respective identities of the intercepted entities, a storing module 606 configured to store the first correlation numbers and the mapping information values such that a table 300 is maintained, said table 300 comprising records 302, each record 302 comprising a correlation number 304 and at least one corresponding mapping information value 306, a receiving module 608 configured to receive, from the IMS 100, a plurality of media messages 405, each message 405 comprising information that defines an identity of an intercepted entity, media payload and a media payload type number associated with the media payload, a calculating module 610 configured to calculate, based on the received media messages 405, a respective second correlation number associated with respective identities of the intercepted entities, an extracting module 612 configured to extract, from the table 300, for each received media message 405, a mapping information value corresponding to the second correlation number and corresponding to the media payload type number, and a transmitting module 614 configured to transmit, to the LEA 118, for each received media message 405, a message 407 comprising the media payload of the received media message and comprising a media encoding name comprised in the extracted mapping information value.

The mediation function apparatus 600 may comprise further modules that are configured to perform in a similar manner as, e.g., the mediation function apparatus 500 described above in connection with FIG. 5

The invention claimed is:

1. A method, performed by a mediation function, for handling lawful interception (LI) information that is being intercepted in an internet protocol multimedia subsystem (IMS), the method comprising:
   receiving a plurality of signaling messages from the IMS, each message comprising information that defines an identity of an intercepted entity and a mapping information value that comprises a mapping of a media payload type number to a media encoding name that identifies a media payload format;
   calculating a respective first correlation number associated with respective identities of the intercepted entities;
   storing the first correlation numbers and the mapping information values such that a table is maintained; the table comprising records, each record comprising a correlation number and at least one corresponding mapping information value;
   receiving a plurality of media messages from the IMS, each message comprising information that defines an identity of an intercepted entity, media payload, and a media payload type number associated with the media payload;
   calculating, based on the received media messages, a respective second correlation number associated with respective identities of the intercepted entities;
   extracting, from the table and for each received media message, a mapping information value corresponding to the second correlation number and corresponding to the media payload type number; and
   transmitting, to a law enforcement agency (LEA) and for each received media message, a message comprising: the media payload of the received media message; and a media encoding name comprised in the extracted mapping information value.

2. The method of claim 1, wherein the receiving the plurality of signaling messages comprises receiving, via an X2 interface, a plurality of session initiation protocol (SIP) messages that comprise session description protocol (SDP) fields.

3. The method of claim 1, wherein:
the mapping information value is a real time protocol (RTP) rtpmap attribute in a session description protocol (SDP) field; and
the receiving the plurality of media messages comprises receiving RTP packets via an X3 interface.

4. The method of claim 3, wherein:
the transmitting comprises transmitting of the RTP packets via an HI3 interface; and
the media encoding names are comprised in respective HI3 header fields.

5. The method of claim 1, wherein the calculation of the first correlation number and/or the second correlation number comprises calculating a call session identifier of the intercepted entity.

6. The method of claim 5, wherein the calculating the call session identifier comprises obtaining IMS charging information assigned to the intercepted entity.

7. A mediation function apparatus for handling lawful interception (LI) information that is being intercepted in an internet protocol multimedia subsystem (IMS), the mediation function apparatus comprising:
processing circuitry;
memory containing instructions executable by the processing circuitry whereby the mediation function apparatus is operative to:
receive a plurality of signaling messages from the IMS, each message comprising information that defines an identity of an intercepted entity and a mapping information value that comprises a mapping of a media payload type number to a media encoding name that identifies a media payload format;
calculate a respective first correlation number associated with respective identities of the intercepted entities;
store the first correlation numbers and the mapping information values such that a table is maintained; the table comprising records, each record comprising a correlation number and at least one corresponding mapping information value;
receive a plurality of media messages from the IMS, each message comprising information that defines an identity of an intercepted entity, media payload, and a media payload type number associated with the media payload;
calculate, based on the received media messages, a respective second correlation number associated with respective identities of the intercepted entities;
extract, from the table and for each received media message, a mapping information value corresponding to the second correlation number and corresponding to the media payload type number; and
transmit, to a law enforcement agency (LEA) and for each received media message, a message comprising the media payload of the received media message and comprising a media encoding name comprised in the extracted mapping information value.

8. The mediation function apparatus of claim 7, wherein the instructions are such that the mediation function apparatus is operative to receive the plurality of signaling messages by receiving, via an X2 interface, a plurality of session initiation protocol (SIP) messages that comprise session description protocol (SDP) fields.

9. The mediation function apparatus of claim 7:
wherein the mapping information value is a real time protocol (RTP) rtpmap attribute in a session description protocol (SDP) field; and
wherein the instructions are such that the mediation function apparatus is operative to receive the plurality of media messages by receiving, via an X3 interface, RTP packets.

10. The mediation function apparatus of claim 9:
wherein the instructions are such that the mediation function apparatus is operative to transmit the message by transmitting RTP packets via an HI3 interface; and
wherein the media encoding names are comprised in respective HI3 header fields.

11. The mediation function apparatus of claim 7, wherein the instructions are such that the mediation function apparatus is operative to calculate the first correlation number and/or the second correlation number by calculating a call session identifier of the intercepted entity.

12. The mediation function apparatus of claim 11, wherein the calculating the call session identifier comprises obtaining IMS charging information assigned to the intercepted entity.

13. A non-transitory computer readable recording medium storing a computer program product for handling lawful interception (LI) information that is being intercepted in an internet protocol multimedia subsystem (IMS), the computer program product comprising software instructions which, when run on processing circuitry of a mediation function, causes the mediation function to:
receive a plurality of signaling messages from the IMS, each message comprising information that defines an identity of an intercepted entity and a mapping information value that comprises a mapping of a media payload type number to a media encoding name that identifies a media payload format;
calculate a respective first correlation number associated with respective identities of the intercepted entities;
store the first correlation numbers and the mapping information values such that a table is maintained; the table comprising records, each record comprising a correlation number and at least one corresponding mapping information value;
receive a plurality of media messages from the IMS, each message comprising information that defines an identity of an intercepted entity, media payload, and a media payload type number associated with the media payload;
calculate, based on the received media messages, a respective second correlation number associated with respective identities of the intercepted entities;
extract, from the table and for each received media message, a mapping information value corresponding to the second correlation number and corresponding to the media payload type number; and
transmit, to a law enforcement agency (LEA) and for each received media message, a message comprising:
the media payload of the received media message; and
a media encoding name comprised in the extracted mapping information value.

14. The non-transitory computer readable recording medium of claim 13, wherein the receiving the plurality of signaling messages comprises receiving, via an X2 interface, a plurality of session initiation protocol (SIP) messages that comprise session description protocol (SDP) fields.

15. The non-transitory computer readable recording medium of claim 13, wherein:

the mapping information value is a real time protocol (RTP) rtpmap attribute in a session description protocol (SDP) field; and the receiving the plurality of media messages comprises receiving RTP packets via an X3 interface.

16. The non-transitory computer readable recording medium of claim 15, wherein:

the transmitting comprises transmitting of the RTP packets via an HI3 interface; and the media encoding names are comprised in respective HI3 header fields.

17. The non-transitory computer readable recording medium of claim 13, wherein the calculation of the first correlation number and/or the second correlation number comprises calculating a call session identifier of the intercepted entity.

18. The non-transitory computer readable recording medium of claim 17, wherein the calculating the call session identifier comprises obtaining IMS charging information assigned to the intercepted entity.

* * * * *